United States Patent [19]
Suthersan

[11] Patent Number: 6,102,623
[45] Date of Patent: *Aug. 15, 2000

[54] IN-WELL AIR STRIPPING, OXIDATION, AND ADSORPTION

[75] Inventor: Suthan S. Suthersan, Yardley, Pa.

[73] Assignee: ARCADIS Geraghty & Miller, Inc., Denver, Colo.

[*] Notice: This patent is subject to a terminal disclaimer.

[21] Appl. No.: 09/313,678

[22] Filed: May 18, 1999

Related U.S. Application Data

[63] Continuation of application No. 08/858,267, May 19, 1997, Pat. No. 6,007,274.

[51] Int. Cl.$^7$ .............................. A62D 3/00; E21B 43/38

[52] U.S. Cl. .......................... 405/128; 210/747; 210/760

[58] Field of Search ............................. 166/312; 405/52, 405/128; 210/170, 747, 758, 760

[56] References Cited

U.S. PATENT DOCUMENTS

Re. 33,102  10/1989  Visser et al. ............................ 166/267
825,745  7/1906  Mitchell .

(List continued on next page.)

FOREIGN PATENT DOCUMENTS 3427 532 C1  8/1985  Germany .

OTHER PUBLICATIONS

A Monitoring and Removal Program for Leaked Propane Gas in the Vadose (Unsaturated) Zone: A Case Study (Thomas Lobasso, Jr. and Andrew J. Barber) (undated).
Hydrogeologic and Geochemical Investigation, Mt. Olive Greens, Mt. Olive Township, N.J.—Nov., 1982.
Ground Water and Wells—A Reference Book for the Water-Well Industry—4$^{th}$ Printing 1975, Chapter 10, pp. 185–208 and Chapter 20, pp. 375–394.
Water Well Technology—Field Principals of Exploration Drilling and Development of Ground Water and Other Selected Minerals (4 page cover and pp. 240–308) (Michael D. Campbell and Jay H. Lehr(—1973.
SPL External Vapor Vending (Elimination) Program—Nov. 2, 1983.
Near Surface Geochemical Monitoring of Underground Gas Storage Facilities—Apr., 1986.
Lexis–Nexis—Environmental Protection Agency, Upjohn Manufacturing Company—Sep. 30, 1988.
Declaration Statement—Record of Decision; Rod Decision Summary (with attachments); and Responsive Summary, Upjohn Manufacturing Company, Superfund Site, Barceloneta, Puerto Rico (undated).
Public Notice (3 pages) (undated).
Fifth National Outdoor Action Conference on Aquifer Restoration, Ground Water Monitoring, and Geophysical Methods—May 13–16, 1991 (Ground Water Mgmt., Book 5 of the Series).
Haztech International '88—Hazardous Waste & Hazardous Materials Management—Sep. 20–22, 1988.
The Fifth National Symposium and Exposition on Aquifer Restoration and Ground Water Monitoring—May 21–24, 1985.

(List continued on next page.)

*Primary Examiner*—George Suchfield
*Attorney, Agent, or Firm*—Standley & Gilcrest LLP

[57] ABSTRACT

A method and system for removing contaminants for the phreatic zone, also known as the saturation zone, or groundwater. The technique involves gas sparging and oxidation while increasing the surface area for mass transfer by the placing of packing balls into the eductor tube. The system is comprised of a means for supplying gas/ozone mixture to the lower extent of a well which induces a flow of groundwater and gas bubbles up the well. The system contains a conduit within the well, which extends below the water table. The conduit has a lower fluid-permeable section which is located below the water table and an upper fluid-permeable section which is adjacent the water table.

2 Claims, 1 Drawing Sheet

U.S. PATENT DOCUMENTS

| | | |
|---|---|---|
| 1,286,666 | 12/1918 | Layne . |
| 1,877,915 | 9/1932 | Lewis . |
| 2,104,327 | 1/1938 | Kotzebue . |
| 2,180,400 | 11/1939 | Coberly . |
| 2,523,091 | 9/1950 | Bruce . |
| 2,635,696 | 4/1953 | Asketh . |
| 2,765,850 | 10/1956 | Allen . |
| 2,875,831 | 3/1959 | Martin et al. . |
| 2,969,226 | 1/1961 | Huntington . |
| 3,216,905 | 11/1965 | Baptist . |
| 3,277,962 | 10/1966 | Flickinger et al. . |
| 3,351,132 | 11/1967 | Dougan et al. . |
| 3,547,190 | 12/1970 | Wilkerson . |
| 3,649,533 | 3/1972 | Reijonen et al. . |
| 3,653,438 | 4/1972 | Wagner .................... 166/266 |
| 3,665,716 | 5/1972 | Rogers et al. . |
| 3,705,851 | 12/1972 | Brauer . |
| 3,727,686 | 4/1973 | Prates et al. ............. 166/261 |
| 3,735,815 | 5/1973 | Myers ...................... 166/313 |
| 3,765,483 | 10/1973 | Vencil ...................... 166/265 |
| 3,796,883 | 3/1974 | Smith et al. . |
| 3,823,777 | 7/1974 | Allen et al. ............... 166/266 |
| 3,828,525 | 8/1974 | Copa et al. ................ 55/68 |
| 3,846,290 | 11/1974 | Raymond . |
| 3,980,138 | 9/1976 | Knopik ..................... 166/314 |
| 3,990,513 | 11/1976 | Perch ....................... 166/267 |
| 4,016,930 | 4/1977 | Arnold ..................... 166/266 |
| 4,026,355 | 5/1977 | Johnson et al. .......... 166/246 |
| 4,126,556 | 11/1978 | Swanson et al. . |
| 4,167,973 | 9/1979 | Forte et al. .............. 166/267 |
| 4,183,407 | 1/1980 | Knopik ..................... 166/314 |
| 4,241,787 | 12/1980 | Price ........................ 166/105 |
| 4,283,212 | 8/1981 | Graham et al. . |
| 4,296,810 | 10/1981 | Price ........................ 166/265 |
| 4,303,127 | 12/1981 | Freel et al. ............... 166/266 |
| 4,306,961 | 12/1981 | Taciuk . |
| 4,323,122 | 4/1982 | Knopik ..................... 166/267 |
| 4,366,846 | 1/1983 | Curati, Jr. . |
| 4,369,839 | 1/1983 | Freeman et al. .......... 166/53 |
| 4,401,569 | 8/1983 | Jhaveri et al. ............ 210/610 |
| 4,435,292 | 3/1984 | Kirk et al. ................ 210/747 |
| 4,442,901 | 4/1984 | Zison ....................... 166/369 |
| 4,469,176 | 9/1984 | Zison et al. .............. 166/250 |
| 4,518,399 | 5/1985 | Croskell et al. .......... 55/16 |
| 4,544,381 | 10/1985 | Schmidt .................... 55/89 |
| 4,574,062 | 3/1986 | Wietman ................... 261/147 |
| 4,576,717 | 3/1986 | Collin et al. .............. 210/610 |
| 4,588,506 | 5/1986 | Raymond et al. ........ 210/606 |
| 4,593,760 | 6/1986 | Visser et al. .............. 166/267 |
| 4,625,801 | 12/1986 | McLaughlin et al. .... 166/267 |
| 4,660,639 | 4/1987 | Visser et al. .............. 166/267 |
| 4,662,900 | 5/1987 | Ottengraf .................. 55/90 |
| 4,664,805 | 5/1987 | Focht ........................ 210/611 |
| 4,683,064 | 7/1987 | Hallberg et al. .......... 210/605 |
| 4,713,343 | 12/1987 | Wilson, Jr. et al. ...... 435/264 |
| 4,715,965 | 12/1987 | Sigerson et al. .......... 210/800 |
| 4,723,968 | 2/1988 | Schippert et al. ......... 55/80 |
| 4,730,672 | 3/1988 | Payne ....................... 166/266 |
| 4,738,206 | 4/1988 | Noland ..................... 110/346 |
| 4,745,850 | 5/1988 | Bastian et al. ............ 98/56 |
| 4,749,491 | 6/1988 | Lawes et al. ............. 210/610 |
| 4,755,304 | 7/1988 | Hallberg et al. .......... 210/747 |
| 4,765,902 | 8/1988 | Ely et al. .................. 210/610 |
| 4,780,215 | 10/1988 | Carlson ..................... 210/760 X |
| 4,782,625 | 11/1988 | Gerken et al. ............ 47/1.42 |
| 4,799,878 | 1/1989 | Schaeffer .................. 431/202 |
| 4,806,148 | 2/1989 | Ottengraf .................. 55/223 |
| 4,832,122 | 5/1989 | Corey et al. .............. 166/266 |
| 4,832,711 | 5/1989 | Christel, Jr. et al. ...... 55/20 |
| 4,842,448 | 6/1989 | Koerner et al. ........... 405/258 |
| 4,846,134 | 7/1989 | Perry et al. ............... 123/520 |
| 4,846,852 | 7/1989 | Schweitzer et al. ...... 55/31 |
| 4,848,460 | 7/1989 | Johnson, Jr. et al. ..... 166/245 |
| 4,850,745 | 7/1989 | Hater et al. ............... 405/258 |
| 4,864,942 | 9/1989 | Fochtman et al. ........ 110/226 |
| 4,872,994 | 10/1989 | Jakob ....................... 210/691 |
| 4,886,119 | 12/1989 | Bernhardt et al. ........ 166/267 |
| 4,890,673 | 1/1990 | Payne ....................... 166/266 |
| 4,892,688 | 1/1990 | Bernhardt ................. 261/24 |
| 4,895,085 | 1/1990 | Chips ....................... 110/346 |
| 4,919,570 | 4/1990 | Payne ....................... 405/128 |
| 4,943,305 | 7/1990 | Bernhardt ................. 55/170 |
| 4,945,988 | 8/1990 | Payne et al. .............. 166/266 |
| 4,950,394 | 8/1990 | Bernhardt et al. ........ 210/170 |
| 4,951,417 | 8/1990 | Gerken et al. ............ 47/1.42 |
| 4,954,258 | 9/1990 | Little ......................... 210/611 |
| 4,966,611 | 10/1990 | Schumacher et al. .... 55/20 |
| 4,982,788 | 1/1991 | Donnelly .................. 166/266 |
| 5,006,250 | 4/1991 | Roberts et al. ........... 210/610 |
| 5,009,266 | 4/1991 | Dieter ....................... 166/245 |
| 5,015,365 | 5/1991 | Vara et al. ................ 208/262.1 |
| 5,017,289 | 5/1991 | Ely et al. .................. 210/610 |
| 5,050,676 | 9/1991 | Hess et al. ................ 166/267 |
| 5,069,286 | 12/1991 | Roensch et al. .......... 166/312 |
| 5,076,360 | 12/1991 | Morrow .................... 166/267 |
| 5,076,727 | 12/1991 | Johnson et al. ........... 405/128 |
| 5,080,793 | 1/1992 | Urlings ..................... 210/603 |
| 5,086,717 | 2/1992 | McCrossan ............... 110/346 |
| 5,095,975 | 3/1992 | Bernhardt ................. 166/67 |
| 5,111,883 | 5/1992 | Savery ..................... 166/269 |
| 5,116,163 | 5/1992 | Bernhardt ................. 405/128 |
| 5,122,165 | 6/1992 | Wang et al. .............. 55/38 |
| 5,122,166 | 6/1992 | Hyrcyk et al. ............ 55/38 |
| 5,143,606 | 9/1992 | Bernhardt ................. 210/170 |
| 5,143,607 | 9/1992 | Bernhardt ................. 210/170 |
| 5,147,535 | 9/1992 | Bernhardt ................. 210/138 |
| 5,161,914 | 11/1992 | Rahn et al. ............... 405/128 |
| 5,171,103 | 12/1992 | Bernhardt ................. 405/128 |
| 5,172,764 | 12/1992 | Hajali et al. .............. 166/267 |
| 5,173,092 | 12/1992 | Rudder ..................... 405/52 X |
| 5,180,503 | 1/1993 | Gorelick et al. .......... 210/758 |
| 5,183,563 | 2/1993 | Rodden .................... 210/180 |
| 5,185,080 | 2/1993 | Boyle ....................... 210/611 |
| 5,197,541 | 3/1993 | Hess et al. ................ 166/67 |
| 5,220,958 | 6/1993 | Bernhardt ................. 166/67 |
| 5,221,159 | 6/1993 | Billings et al. ........... 405/128 |
| 5,263,795 | 11/1993 | Corey et al. .............. 405/128 |
| 5,277,815 | 1/1994 | Beeman .................... 210/605 |
| 5,279,740 | 1/1994 | Basile et al. .............. 210/610 |
| 5,281,333 | 1/1994 | Bernhardt ................. 210/170 |
| 5,302,286 | 4/1994 | Semprini et al. ......... 210/610 |
| 5,318,698 | 6/1994 | Bernhardt ................. 210/170 X |
| 5,330,651 | 7/1994 | Robertson et al. ....... 210/617 |
| 5,358,357 | 10/1994 | Mancini et al. ........... 405/128 |
| 5,382,267 | 1/1995 | Savage et al. ............ 44/623 |
| 5,384,048 | 1/1995 | Hazen et al. ............. 210/605 |
| 5,389,267 | 2/1995 | Gorelick et al. .......... 210/758 |
| 5,402,848 | 4/1995 | Kelly ........................ 166/266 |
| 5,425,598 | 6/1995 | Pennington ............... 405/118 |
| 5,439,594 | 8/1995 | Regan et al. .............. 210/747 |
| 5,441,365 | 8/1995 | Duffney et al. ........... 405/128 |
| 5,441,640 | 8/1995 | Vail et al. ................. 210/611 |
| 5,456,550 | 10/1995 | Devlin ...................... 405/128 |
| 5,480,549 | 1/1996 | Looney et al. ............ 1210/610 |
| 5,545,801 | 8/1996 | Fulton ...................... 588/249 |
| 5,545,803 | 8/1996 | Heath et al. .............. 588/253 |
| 5,554,290 | 9/1996 | Suthersan ................. 210/610 |
| 5,575,589 | 11/1996 | Suthersan ................. 405/128 |
| 5,588,490 | 12/1996 | Suthersan et al. ........ 166/370 |
| 5,698,092 | 12/1997 | Chen ........................ 210/170 X |
| 5,713,522 | 2/1998 | Lundberg ................. 239/265.39 |
| 5,833,388 | 11/1998 | Edwards et al. .......... 405/52 |

| | | | |
|---|---|---|---|
| 5,833,855 | 11/1998 | Saunders | 210/611 |
| 5,893,975 | 4/1999 | Eifert | 210/602 |
| 6,007,274 | 12/1999 | Suthersan | 405/128 |

OTHER PUBLICATIONS

Proceedings of the NWWA/API Conference on Petroleum Hydrocarbons and Organic Chemicals in Ground Water—Prevention, Detection and Restoration—Nov. 13–15, 1985.

Vol. II, Proceedings of Petroleum Hydrocarbons and Organic Chemicals in Ground Water: Prevention, Detection and Restoration—Nov. 9–11, 1988.

In Situ Aeration of Groundwater: A Technology Overview—Oct. 16–17, 1990.

In Situ Walls, Remediation Engineering, Chapter 7, pp. 187–206.

IN-WELL AIR STRIPPING, OXIDATION, AND ADSORPTION

This is a continuation of U.S. application Ser. No. 08/858,267, filed May 19, 1997 now U.S. Pat. No. 6,007,274.

BACKGROUND OF THE INVENTION

The present invention relates generally to a method and apparatus for removing contaminants from groundwater, and, more particularly to an in-situ air stripping, oxidation, and adsorption method for removing volatile organic compounds (VOCs) from groundwater.

Contamination of the phreatic zone, also known as zone of saturation, or, groundwater, with potentially hazardous materials is a common problem facing industry, the government and the general public. The most common type of VOC pollutants are petroleum based products and chlorinated solvents. Frequently, as a result of spills, leakage from storage facilities or surface discharges, contaminants percolate into groundwater, thereby posing a threat to drinking water supplies.

While groundwater is not as susceptible to pollution as surface water, once polluted, its restoration is difficult and long term. Typically, contaminated groundwater is removed from the phreatic zone, treated and discharged or returned to the phreatic zone. These "pump-and-treat", or above ground, methods, are relatively expensive. There have been some recent developments in insitu water treatment which employ air lift pumping as a means of producing gas bubbles to remove VOCs. The theory of these known methods is that gas is pumped into the wells which causes water and subsequently formed gas bubbles to rise upward. VOCs are transferred from the contaminated water to the gas bubbles which can then be collected for treatment. However, frequently these devices do not result in rapid mass transfer and vapor saturation which results in a slower and less efficient process. Vapor saturation occurs when the rising bubbles become saturated with VOC vapor. Therefore, there is a need for the development of an insitu air stripping, oxidation, and adsorption remediation method for removing contaminants in a relatively inexpensive and more efficient manner.

The present invention involves new concepts for in-well removal of contaminants from the saturation zone. It avoids expensive "above ground" remediation methods, and provides a more efficient method of mass removal of dissolved contaminants. The present invention combines packing/stripping materials (balls) with air stripping techniques in the well. In addition oxidation and adsorption techniques can also be incorporated to compliment the air stripping effect to achieve higher mass removal efficiencies. The injected gas may be air or any specific or combination of gases such as nitrogen gas. The injected gas can be at any desired temperature.

SUMMARY OF THE INVENTION

Objects of the invention, as will be apparent herein, are accomplished by injecting a gas into the lower extent of a well to force groundwater up the well through air lifting, causing VOCs to be transferred to rising gas bubbles inside the well. The available surface area for contaminant mass transfer within the flow of the mixture of groundwater and gas bubbles is increased by placing packing balls (preferably JAEGER TRIPACK packing material) into the well. This step significantly increases the overall mass transfer efficiency of this device. The gas bubbles, containing VOC vapors are then separated from the groundwater at the upper extent of the well. As this process is repeated and the groundwater continues to circulate, the VOC concentrations in the water are reduced. In addition ozone can be mixed with the injected gas to enhance the mass removal by direct oxidation of the contaminants present.

It is preferable that the air be supplied to the lower extent of the well by operating an air pump which is in fluid communication with a tube positioned in the well in a conduit, where the tube has an opening at its lower extent. Ozone can be added to this line of injection.

It is also preferable that the separated gas bubbles and captured air be stored upon being released from the conduit. It is also preferable that the contaminants be removed from the captured air prior to discharge to the atmosphere.

The system for removing VOCs from contaminated groundwater is comprised of a means for supplying gas and ozone to the lower extent of a well which induces a flow of groundwater and gas bubbles up the well. The system contains a conduit within the well, which extends below the water table The conduit has a lower fluid-permeable section which is located below the water table and an upper fluid-permeable section which is adjacent the water table. The present invention is further comprised of an internal pipe or eductor tube contained in the conduit which extends from the top extent of the conduit to the saturation zone. Packing materials are located between the eductor tube and the means for supplying gas to the lower extent of the well to increase the available surface area for mass transfer. The present invention also contains a means, which is located near the top of the conduit, for separating the gas bubbles from the groundwater.

It is preferable that the system of the present invention contain a gas supplying means which includes a tube contained within the conduit and eductor tube, which extends from above the ground surface to below the water table, a pump which supplies air to the tube and an ozone generator to provide the right amount of ozone.

It is also preferable that the system of the present invention contain a bentonite seal located between said conduit and well wall to separate the treated clean water from the contaminated water.

It is preferable that the system of the present invention contain a means for capturing the gas bubbles which have been separated from the groundwater.

Objects and advantages of the present invention will be readily apparent upon a reading of the following description.

DETAILED DESCRIPTION OF PREFERRED EMBODIMENTS

Figure 1:
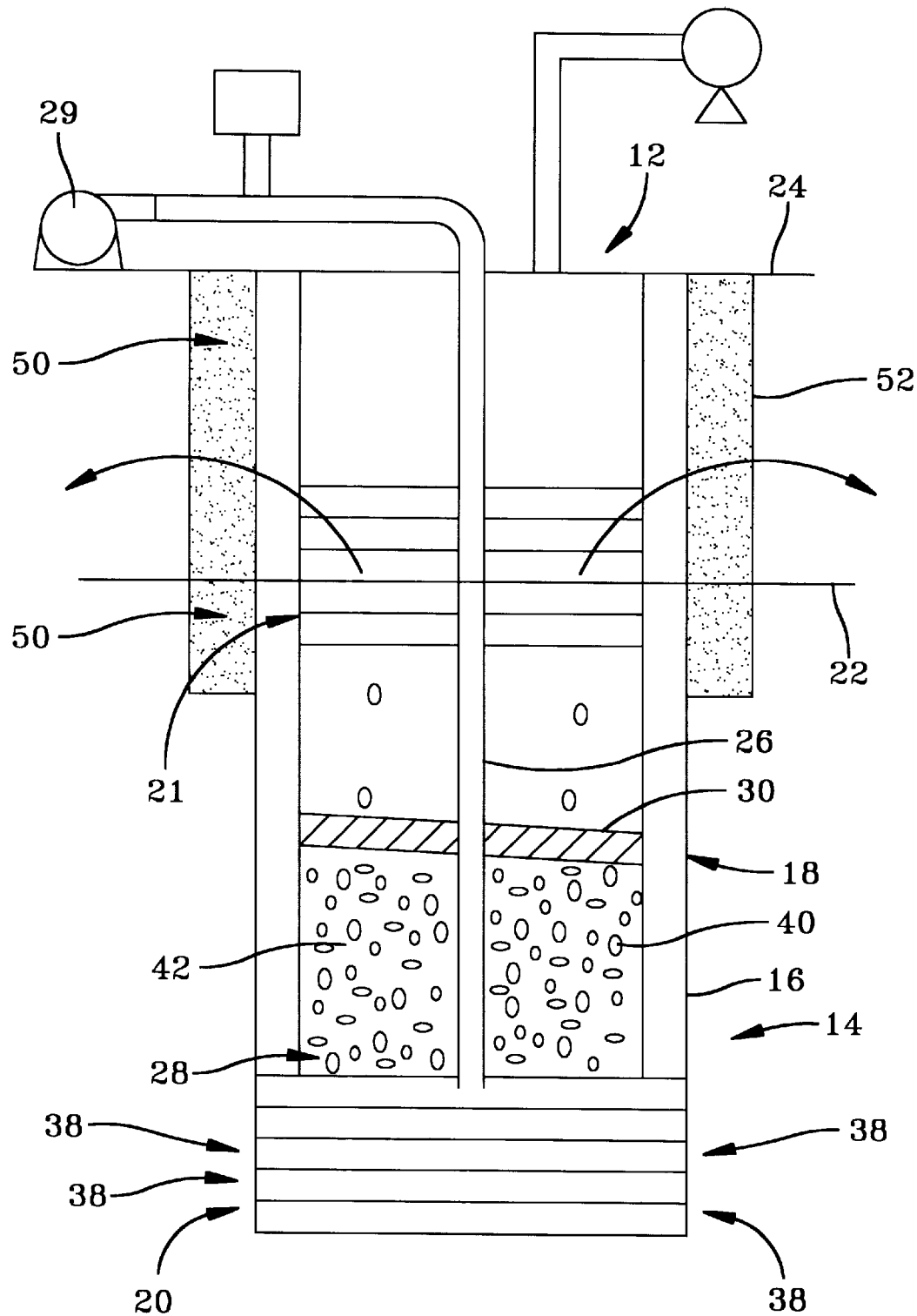
FIG. 1 is a cross-sectional view of a preferred embodiment of the present invention.

The preferred method and system herein described are not intended to be exhaustive or to limit the invention to the precise forms disclosed. They are chosen and described to explain the principles of the invention, and the application of the method to practical uses, so that others skilled in the art may practice the invention.

As shown in FIG. 1, the present invention removes VOCs from contaminated groundwater by supplying a gas such as air and ozone mixture into a well 18. When air/ozone mixture is injected into a well, groundwater is lifted upward through the well creating a recirculating cleaning process. As the groundwater rises up through the well, VOCs are transferred from the contaminated groundwater to rising air bubbles created by the air supply in addition to direct oxidation by ozone. The VOC vapor is then released at the top of the well or, alternatively captured for treatment. The treated water, which is now free of a portion of VOCs, flows out of the conduit 16 to mix with the groundwater.

FIG. 1 illustrates one embodiment of the present invention. A borehole 12 is positioned in the contaminated area extending down into the phreatic, or saturated, zone 14 of the well 18. The external conduit 16 is positioned within the borehole 12. The conduit 16 has two fluid-permeable sections: one located near the base of the conduit at 20 below the water table and the other 21 located near the water table 22, but below ground level 24. The fluid-permeable sections may be comprised of screened PVC pipe or another suitable material. The remaining portions of conduit 16 may be comprised of impermeable material such as PVC pipe or another suitable material.

An internal pipe 30, or eductor pipe, is placed between the air tube 26 and the external pipe 16. The air being pumped into the well is contained in the eductor pipe. The eductor pipe 30 may also be closed at the lower end. If the eductor pipe is closed at the lower end, slots placed at the lower end can allow water to flow into the pipe while preventing air bubbles from escaping.

A compressed air tube 26 is positioned within the conduit 16 and extends substantially to the base of the conduit 16 at 28. The tube 26 may be open at the base at 26 and attached to an air pump 29 and an ozone generator 54 at the top of the conduit. Alternatively, an air pump may be located at the base of the conduit 16 and connected to tube 26 at 28 (not shown). A packer 56 may be placed inside the well.

The operation of the present invention may be understood by reference to FIG. 1. Groundwater may flow through the phreatic zone 14 as illustrated by the solid line arrows 38. Alternatively, the groundwater may not flow through the phreatic zone. The present invention operates effectively in either case.

An air pump is operated to force air into the air tube 26 down to the base of the conduit 16 at 28. A gas, such as carbon monoxide, can also be used as appropriate. The air can be injected at various rates to vary the rate at which groundwater circulates toward the well.

The air/ozone mixture, being pumped into the tube, is released at the base of the conduit 28, creating air bubbles and introducing ozone molecules. Subsequently, water flows up the well, while water surrounding the well is pulled towards the well. The water/air mixture rises up in the space, or "mixing zone" 40, between the air tube 26 and the eductor tube 30. As the air rises, it mixes with the water within the eductor tube and creates water flow from the lower permeable section 20 of the conduit 16 upwards through the conduit and out of the upper permeable section of the conduit 21.

During the time that the water/air mixture is flowing up the eductor pipe, VOCs are transferred from the water to the gas phase in addition to oxidation of contaminants to inert end products. Or in other words, while mixing with the water, the air strips the water of volatile contaminants in the mixing zone 40 in addition to direct oxidation. The air/contaminant gas mixture is then separated from the water/air mixture near the top of the conduit 16. Once the gas is separated from the water, the gas mixture is then released above the water table into the atmosphere. Alternatively, the air/contaminant gas mixture may be captured for treatment or discharge. The VOC vapor can be extracted from the gas mixture using vacuum vapor extraction techniques also to enhance the stripping efficiencies of contaminants. Once the air is separated from the water, the water, less a portion of VOCs, is passed back into the aquifer through the upper permeable section 21 of the conduit 16.

As discussed previously, while the water/air mixture is flowing up the eductor pipe, VOCs are transferred from the water to the gas phase in addition to oxidation of compounds. However, frequently this process does not result in complete mass transfer of the contaminants. Mass removal occurs when the rising bubbles become saturated with VOC vapor in addition to the oxidation. When incomplete stripping occurs, small amounts of VOCs are left in the effluent water. This results in a poor stripping efficiency which results in a slower and less efficient clean up process. To enhance the stripping process, packing materials such as JAEGER TRIPACK packing balls 42 are placed in the zone 40 to cause the air and water to pass over the surface of the balls resulting in a more efficient air stripping. Several different packing materials may be used to achieve a similar result to the preferred JAEGER TRIPACK packing balls.

Adsorption media 50 may be placed in a trench 52 or annular holes near the top of the well for use in remediating residue of contamination not removed by the air stripping and/or contaminants, such as heavy metals, which are not removed by air stripping or oxidation by ozone. As the water and vapor leave the screened portion 21 of the well, in the preferred embodiment it must pass through the adsorption media 50 that resides in the trench 52. An example of an adsorption media is activated carbon or ion exchange material.

What is claimed is:

1. A method for removing contaminants from groundwater, comprising:

providing a well extending from the ground surface into the saturated zone;

providing a conduit within the well, extending below the water table, the conduit having a lower fluid-permeable section below the water table and an upper fluid-permeable section adjacent the water table;

injecting a gas into the lower extent of the well to induce a flow of groundwater and gas bubbles up the well;

providing packing material in the conduit so that the groundwater and gas bubbles flow over a surface of the packing material causing volatile organic compounds (VOCs) to be transferred to rising gas bubbles; and optionally separating the gas bubbles from the groundwater.

2. The method of claim 1 further comprising treating the gas bubbles to remove contaminants.

* * * * *